(12) United States Patent
Yu et al.

(10) Patent No.: US 11,074,457 B2
(45) Date of Patent: Jul. 27, 2021

(54) IDENTIFYING ADVERTISEMENTS EMBEDDED IN VIDEOS

(71) Applicant: INTERNATIONAL BUSINESS MACHINES CORPORATION, Armonk, NY (US)

(72) Inventors: Ying-Chen Yu, Taipei (TW); Jeff Hsueh-Chang Kuo, Taipei (TW); Chih-Wen Su, Taipei (TW); June-Ray Lin, Taipei (TW)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 176 days.

(21) Appl. No.: 16/386,300

(22) Filed: Apr. 17, 2019

(65) Prior Publication Data

US 2020/0334469 A1 Oct. 22, 2020

(51) Int. Cl.
*G06K 9/00* (2006.01)
*G06K 9/62* (2006.01)

(52) U.S. Cl.
CPC ..... *G06K 9/00758* (2013.01); *G06K 9/00744* (2013.01); *G06K 9/6211* (2013.01)

(58) Field of Classification Search
CPC ............. G06K 9/00758; G06K 9/6211; G06K 9/00744
See application file for complete search history.

(56) References Cited

U.S. PATENT DOCUMENTS

| 6,297,853 | B1* | 10/2001 | Sharir | ................... G01S 3/7864 348/153 |
| 8,311,390 | B2 | 11/2012 | Berry | |
| 8,873,642 | B2 | 10/2014 | Vanderhoff et al. | |
| 9,865,005 | B1* | 1/2018 | Pottjegort | .............. G06Q 30/02 |
| 10,346,879 | B2* | 7/2019 | Solomon | ............ G06Q 30/0241 |
| 2009/0040383 | A1* | 2/2009 | Terasaki | ............. H04N 21/8455 348/559 |
| 2014/0281901 | A1* | 9/2014 | Mostowy | .............. G06F 16/958 715/234 |
| 2015/0156354 | A1 | 6/2015 | Freed et al. | |

(Continued)

FOREIGN PATENT DOCUMENTS

| EP | 2419861 A1 | 4/2010 |
| WO | 2017027824 A1 | 2/2017 |

OTHER PUBLICATIONS

Marques, Oge "Automatic detection of TV commercials", https://www.researchgate.net/publication/3227702; article in IEEE Potentials Apr./May 2004; 5 pgs.

*Primary Examiner* — Bobbak Safaipour
(74) *Attorney, Agent, or Firm* — Cantor Colburn LLP; Richard Wilhelm

(57) ABSTRACT

Embodiments of the present invention are directed to a computer-implemented method for identifying advertisements in a video. The method includes obtaining a plurality of copies of the video and processing each of the plurality of copies of the video, wherein the processing identifies a plurality of iframes in each of the plurality of copies of the video. The method also includes comparing the plurality of iframes of each of the plurality of copies of the video. The method further includes identifying one or more common portions of each of the plurality of copies of the video one or more advertisement in the video, based on the comparison.

18 Claims, 7 Drawing Sheets

(56) References Cited

U.S. PATENT DOCUMENTS

| | | |
|---|---|---|
| 2015/0163545 A1 | 6/2015 | Freed |
| 2015/0373300 A1* | 12/2015 | Thorpe ................ H04N 9/8205 386/331 |
| 2015/0381603 A1* | 12/2015 | Jakobsson .............. G06F 21/31 726/5 |
| 2016/0142792 A1* | 5/2016 | Lee ..................... H04N 21/235 725/32 |
| 2017/0041655 A1* | 2/2017 | Harrison ........... H04N 21/4782 |
| 2017/0048596 A1* | 2/2017 | Fonseca, Jr. ......... H04N 21/234 |
| 2017/0103430 A1* | 4/2017 | Gilbert ............... G06Q 30/0277 |
| 2017/0111666 A1* | 4/2017 | Chen ..................... G11C 11/14 |
| 2018/0365735 A1* | 12/2018 | Dow ................. G06Q 30/0217 |
| 2019/0238615 A1* | 8/2019 | Freedman ............... G06F 40/14 |
| 2019/0281042 A1* | 9/2019 | Jakobsson ............. G06F 21/552 |
| 2020/0043041 A1* | 2/2020 | Shaw ................ G06Q 30/0248 |

\* cited by examiner

IDENTIFYING ADVERTISEMENTS EMBEDDED IN VIDEOS

BACKGROUND

The present invention generally relates to video processing and more specifically, to identifying advertisements in videos.

In recent years, due to improvements in broadband technology, people have continually increased the number of online videos that they watch. Recently, it has become common for advertisements to be embedded into videos that are provided to individuals. These embedded advertisements detract from the enjoyment of the individual watching the video. On the other hand, authors of videos are concerned that improperly injected advertisements could ruin the intended viewing experiences for their videos. Accordingly, there is a need, for both from video producers and video consumers, to identify the embedded advertisements in videos that have been inserted by intermediaries.

SUMMARY

Embodiments of the present invention are directed to a computer-implemented method for identifying advertisements in a video. A non-limiting example of the computer-implemented method includes obtaining a plurality of copies of the video and processing each of the plurality of copies of the video, wherein the processing identifies a plurality of iframes in each of the plurality of copies of the video. The method also includes comparing the plurality of iframes of each of the plurality of copies of the video. The method further includes identifying one or more common portions of each of the plurality of copies of the video one or more advertisement in the video, based on the comparison.

Embodiments of the present invention are directed to a system for identifying advertisements in a video. A non-limiting example of the system includes a processor and a memory communicatively coupled to the processor. The memory has stored therein instructions that when executed cause the processor to obtain a plurality of copies of the video and processes each of the plurality of copies of the video, wherein the processing identifies a plurality of iframes in each of the plurality of copies of the video. The memory has stored therein instructions that when executed cause the processor to compare the plurality of iframes of each of the plurality of copies of the video. The memory has stored therein instructions that when executed cause the processor to identify one or more common portions of each of the plurality of copies of the video one or more advertisement in the video, based on the comparison.

Embodiments of the invention are directed to a computer program product for identifying advertisements in a video, the computer program product comprising a computer readable storage medium having program instructions embodied therewith. The program instructions are executable by a processor to cause the processor to perform a method. A non-limiting example of the method includes obtaining a plurality of copies of the video and processing each of the plurality of copies of the video, wherein the processing identifies a plurality of iframes in each of the plurality of copies of the video. The method also includes comparing the plurality of iframes of each of the plurality of copies of the video. The method further includes identifying one or more common portions of each of the plurality of copies of the video one or more advertisement in the video, based on the comparison.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
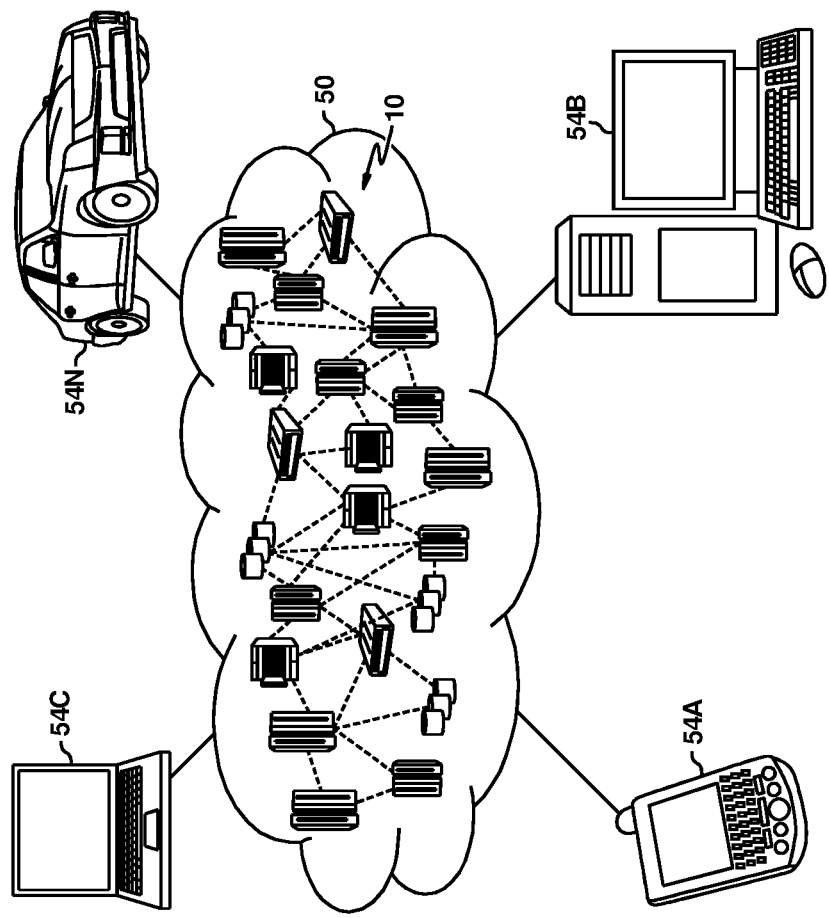
FIG. 1 depicts a cloud computing environment according to an embodiment of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
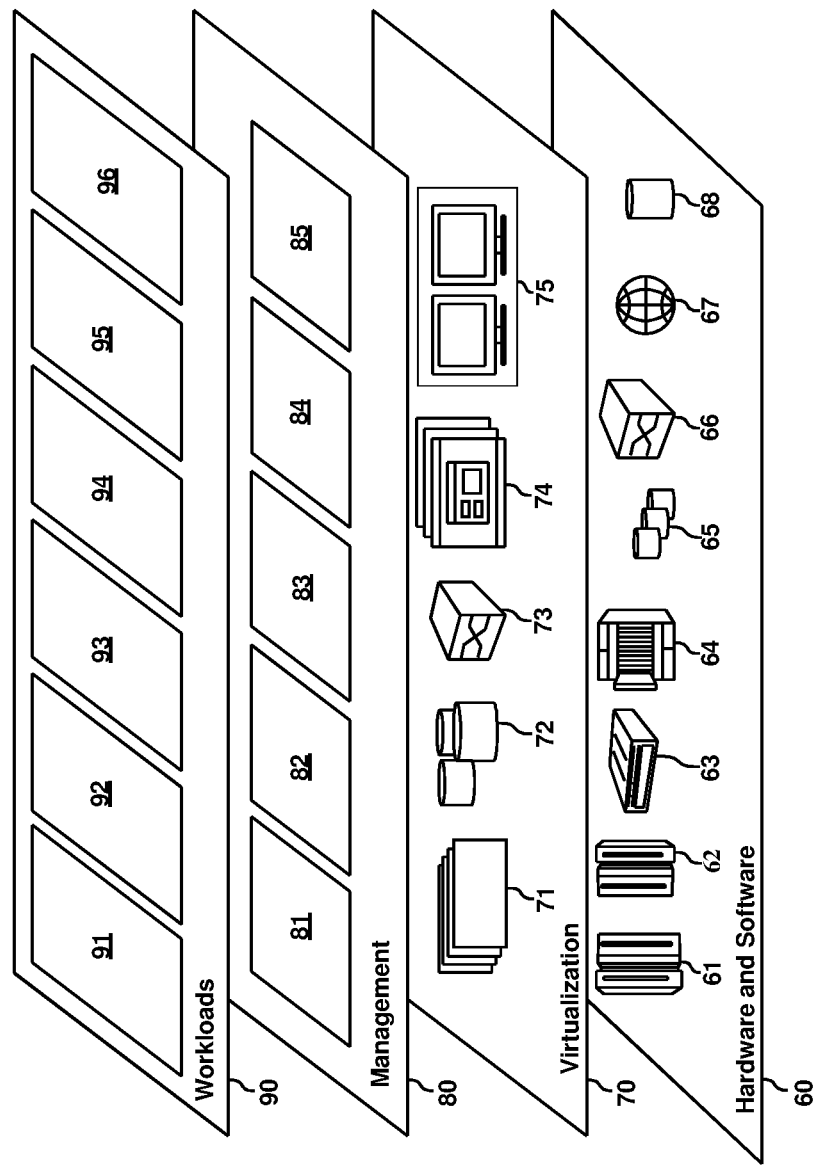
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components.

Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; CAN processing 95; and video processing 96.

Figure 3:
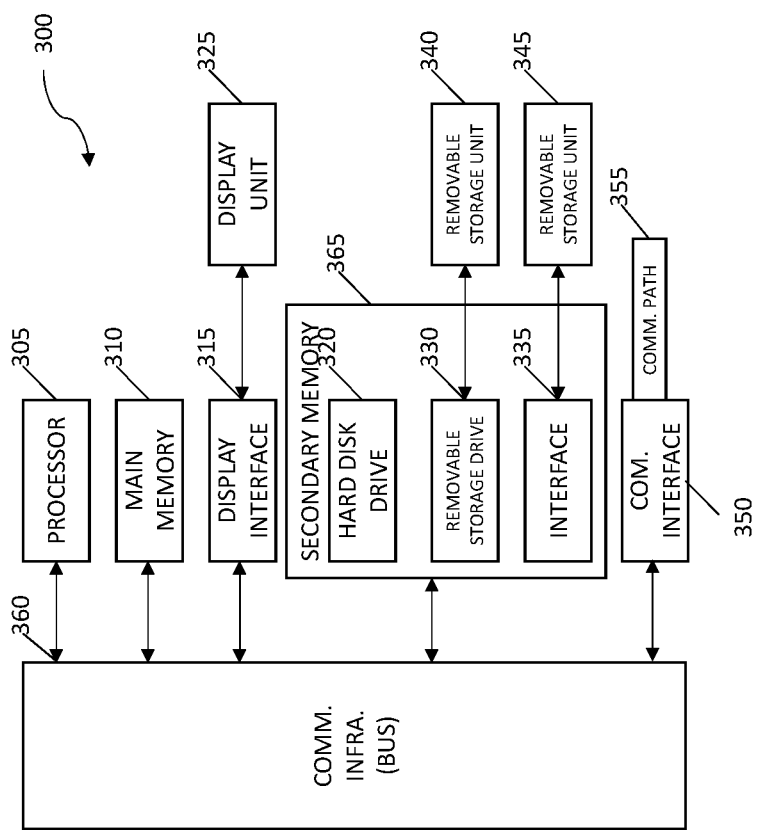
FIG. 3 depicts a high-level block diagram computer system, which can be used to implement one or more aspects of the present invention.

FIG. 3 depicts a high-level block diagram computer system 300, which can be used to implement one or more aspects of the present invention. More specifically, computer system 300 can be used to implement some hardware components of embodiments of the present invention. Although one exemplary computer system 300 is shown, computer system 300 includes a communication path 355, which connects computer system 300 to additional systems (not depicted) and can include one or more wide area networks (WANs) and/or local area networks (LANs) such as the Internet, intranet(s), and/or wireless communication network(s). Computer system 300 and additional system are in communication via communication path 355, e.g., to communicate data between them.

Computer system 300 includes one or more processors, such as processor 305. Processor 305 is connected to a communication infrastructure 360 (e.g., a communications bus, cross-over bar, or network). Computer system 300 can include a display interface 315 that forwards graphics, text, and other data from communication infrastructure 360 (or from a frame buffer not shown) for display on a display unit 325. Computer system 300 also includes a main memory 310, preferably random access memory (RAM), and can also include a secondary memory 365. Secondary memory 365 can include, for example, a hard disk drive 320 and/or a removable storage drive 330, representing, for example, a floppy disk drive, a magnetic tape drive, or an optical disk drive. Removable storage drive 330 reads from and/or writes to a removable storage unit 340 in a manner well known to those having ordinary skill in the art. Removable storage unit 340 represents, for example, a floppy disk, a compact disc, a magnetic tape, or an optical disk, etc. which is read by and written to by removable storage drive 330. As will be appreciated, removable storage unit 340 includes a computer readable medium having stored therein computer software and/or data.

In alternative embodiments, secondary memory 365 can include other similar means for allowing computer programs or other instructions to be loaded into the computer system. Such means can include, for example, a removable storage unit 345 and an interface 335. Examples of such means can include a program package and package interface (such as that found in video game devices), a removable memory chip (such as an EPROM, or PROM) and associated socket, and other removable storage units 345 and interfaces 335 which allow software and data to be transferred from the removable storage unit 345 to computer system 300.

Computer system 300 can also include a communications interface 350. Communications interface 350 allows software and data to be transferred between the computer system and external devices. Examples of communications interface 350 can include a modem, a network interface (such as an Ethernet card), a communications port, or a PCM-CIA slot and card, etcetera. Software and data transferred via communications interface 350 are in the form of signals which can be, for example, electronic, electromagnetic, optical, or other signals capable of being received by communications interface 350. These signals are provided to communications interface 350 via communication path (i.e., channel) 355. Communication path 355 carries signals and can be implemented using wire or cable, fiber optics, a phone line, a cellular phone link, an RF link, and/or other communications channels.

In the present description, the terms "computer program medium," "computer usable medium," and "computer readable medium" are used to generally refer to media such as main memory 310 and secondary memory 365, removable storage drive 330, and a hard disk installed in hard disk drive 320. Computer programs (also called computer control logic) are stored in main memory 310 and/or secondary memory 365. Computer programs can also be received via communications interface 350. Such computer programs, when run, enable the computer system to perform the features of the present invention as discussed herein. In particular, the computer programs, when run, enable processor 305 to perform the features of the computer system. Accordingly, such computer programs represent controllers of the computer system.

Turning now to an overview of technologies that are more specifically relevant to aspects of the invention, methods, systems and computer program products for identifying embedded advertisements in videos are provided. In exemplary embodiments, multiple copies of a desired video are obtained and analyzed to identify common portions among the copies of the videos and different portions among the copies of videos. The different portions are determined to be embedded advertisements and an advertisements free copy of the desired video is created by removing all portions that are not identified as common portions from a copy of the video. In exemplary embodiments, each of the copies of the videos are processed to identify a plurality of iframes in the video and a comparison of the extracted iframes is used to classify portions of the video as common or distinct.

In general, videos are composed of a series of frames, which can be classified into three types, iframes, pframes and bframes. These classifications are generally known and used in the field of video compression. An iframe, or intra-coded picture, is a complete image, like a JPG or BMP image file. A pframe, or predicted picture, holds only the changes in the image from the previous frame. For example, in a scene where an object moves across a stationary background, only the movement of the object needs to be encoded. A bframe, or bidirectional predicted picture, saves even more space by using differences between the current frame and both the preceding and following frames to specify its content.

Figure 4:
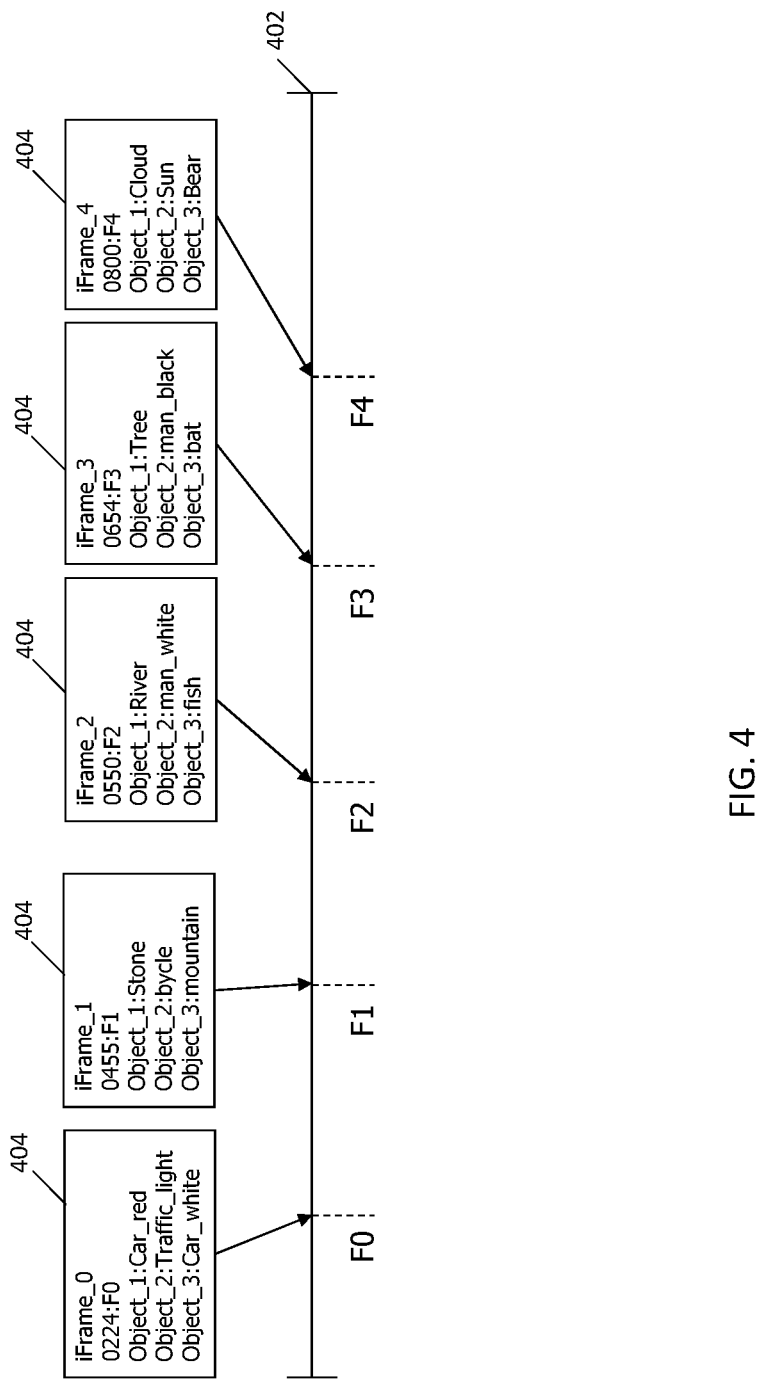
FIG. 4 depicts an illustration of extracting iframes from a video in accordance with an embodiment of the present invention.

Referring now to FIG. 4, an illustration of extracting iframes 404 from a video 402 in accordance with an embodiment of the present invention is shown. As illustrated, a video 402 is processed to identify a plurality of iframes 404 in the video 402. In one embodiment, the video is received in a compressed format and the iframes only need to be extracted from the compressed file. Once each of the iframes 404 are identified, a data record for each is created. The data record includes an iframe number, a timestamp, and an identification of one or more objects depicted in the iframe. In exemplary embodiments, a variety of known image processing techniques can be applied to the iframe to identify the one or more objects depicted in the iframe.

Figure 5:
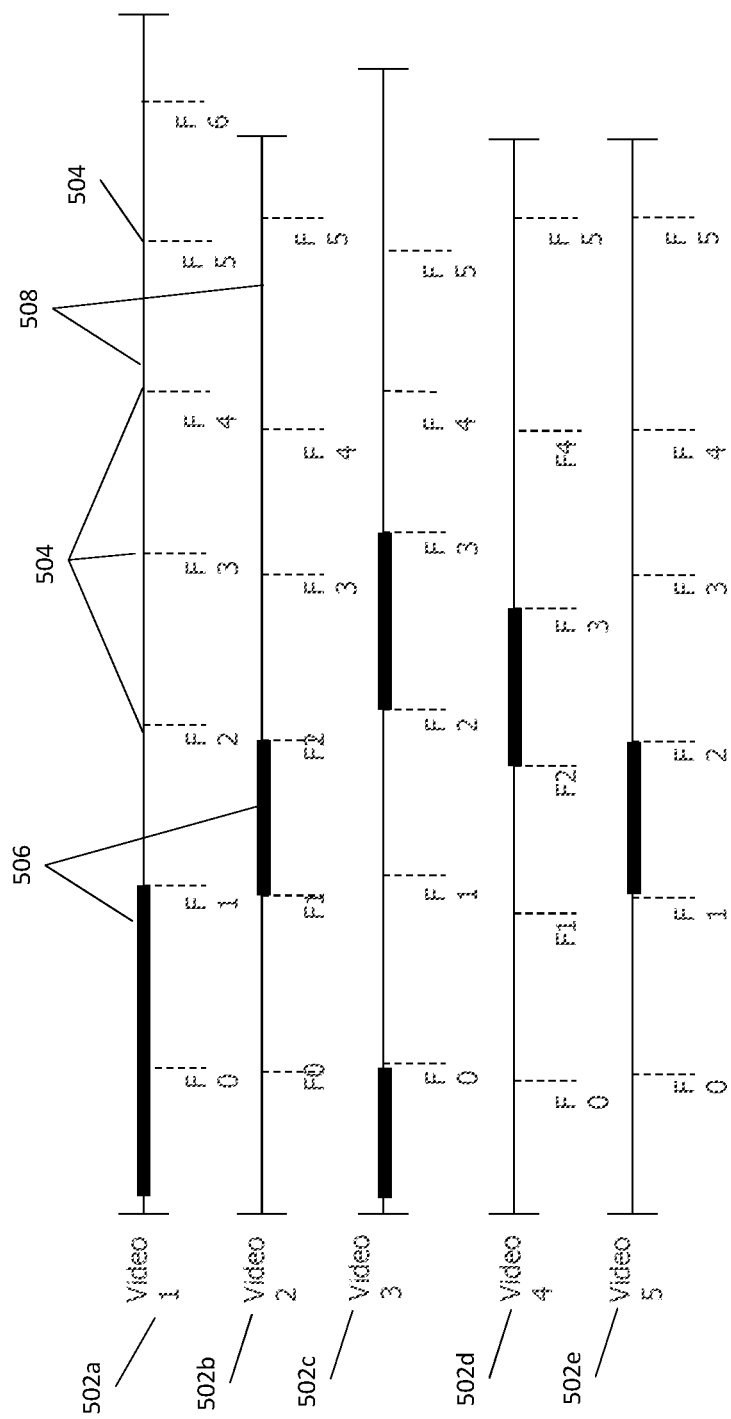
FIG. 5 depicts an illustration of comparing iframes extracted from multiple videos to identify common portions of the videos in accordance with an embodiment of the present invention.

Referring now to FIG. 5 an illustration of a comparison of iframes 504 extracted from multiple videos 502a-502e to identify common portions of the videos in accordance with an embodiment of the present invention is shown. In exemplary embodiments, each of the videos 502a-502e are processed and a plurality of iframes 504, are identified for each video 502. Once the iframes have been identified for each video 502, the iframes 504 for each of the videos 502a-502e are compared. Based on the comparison of the iframes 504, each video 502 is divided into a plurality of portions that are classified as common portions 508 or different portions 506.

As used herein, a common portion 508 is a portion of the video 502 that is present in each of the multiple videos 502a-502e and a different portion 506 is a portion of the video 502 that is not present in all of the multiple videos 502a-502e. In exemplary embodiments, the different portions 506 are determined to be embedded advertisements in the video 502. Once the advertisements in the videos 502a-502e are identified, an advertisement free copy of the video 502 can be created by removing the different portions 506 from one of the videos 502a-502e.

Figure 6:
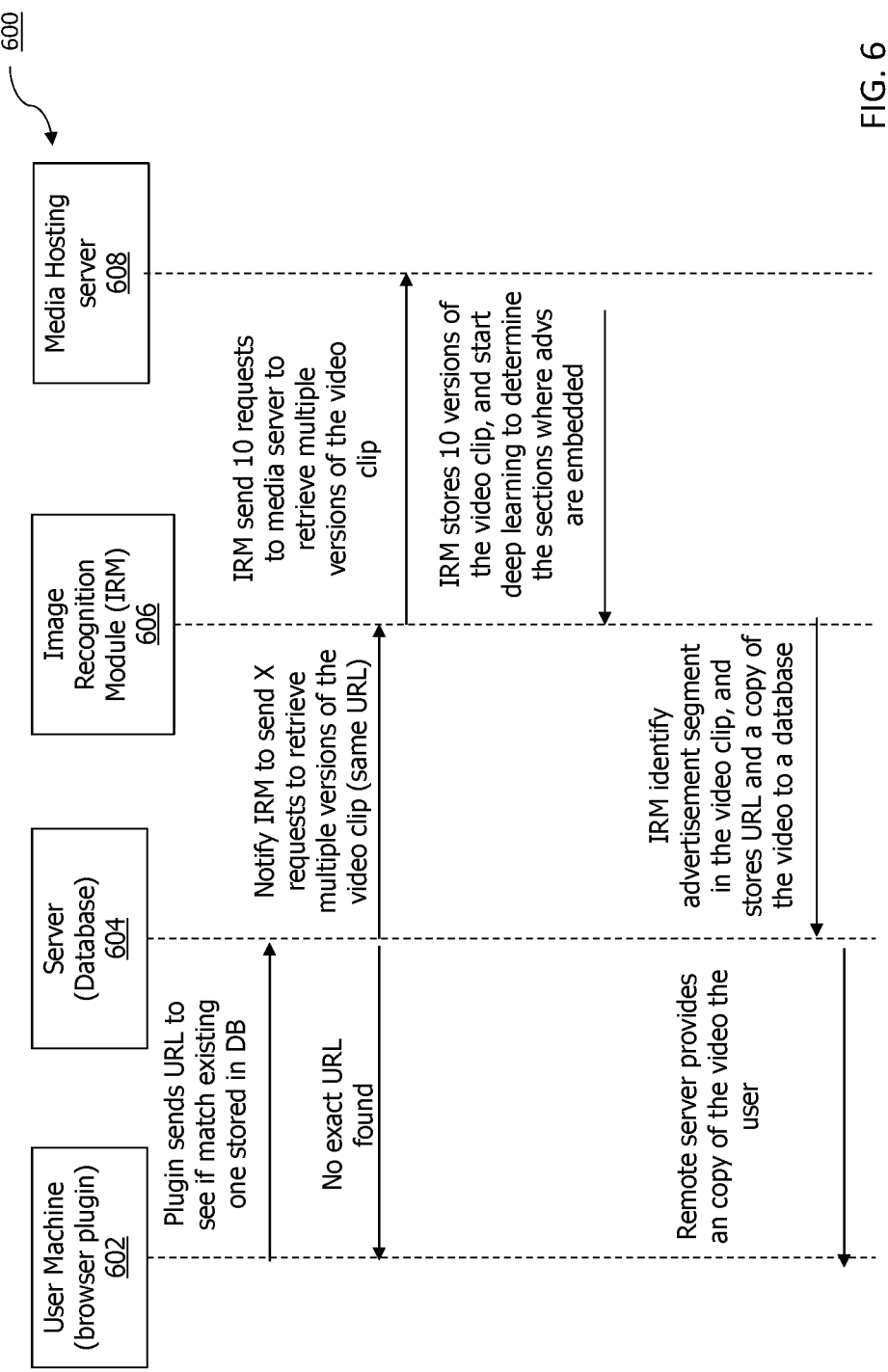
FIG. 6 depicts a flow diagram of a method for providing an advertisement free copy of a video to a user in accordance with an embodiment of the present invention.

Referring now to FIG. 6, a flow diagram of a method 600 for providing an advertisement free copy of a video to a user in accordance with an embodiment of the present invention is shown. As illustrated the method 600 includes a user machine 602 transmitting a request for an advertisement free video to a server 604. In one embodiment, the request includes a uniform resource locator (URL) for the desired video. The server 604 queries a database to determine if it has a copy of the video that has the identified advertisements. If the server 604 does not have such copy of the video, it transmits a request to an image recognition module (IRM) 606. The IRM 606 obtains multiple copies of the video from a media hosting server 608. Next, the IRM 606 processes the multiple copies of the video to identify advertisements in the videos, and stores a copy of the video, including the identified advertisements, and the corresponding URL in a database of the server 604. The method 600 concludes by providing the copy of the video, including the identified advertisements, the user machine 602. Although illustrated as distinct entities, the IRM 606 may be part of the server 604.

Figure 7:
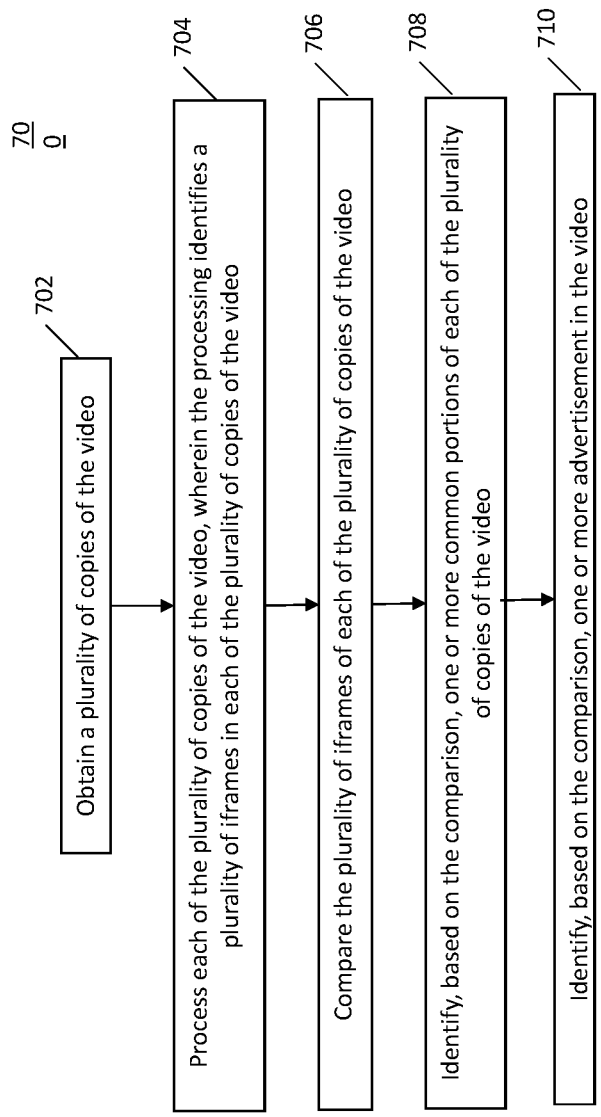
FIG. 7 depicts a flowchart of a method for identifying advertisements in a video in accordance with an embodiment of the present invention.

FIG. 7 depicts a flowchart of a method 700 for identifying advertisements in a video in accordance with an embodiment of the present invention. As shown at block 702, the method 700 includes obtaining a plurality of copies of a video. In exemplary embodiments, at least two or more of the plurality of copies of the video are obtained using different user accounts, each user account includes a user browsing history and web browser cache. In another embodiment, at least two or more of the plurality of copies of the video are obtained using different source addresses. By using one or more of these techniques to obtain copies of the videos, the likelihood that the same advertisement will be embedded in the videos will be reduced. In exemplary embodiments, the number of copies of the video obtained is sufficiently large to ensure that the embedded advertisements will vary across the videos. In one example, ten copies of a desired video are obtained. Next, as shown at block 704, the method 700 includes processing each of the plurality of copies of the video, the processing identifies a plurality of iframes in each of the plurality of copies of the video. In exemplary embodiments, a data record is created for each of the plurality of iframes. The data record includes an identification of one or more objects depicted in a corresponding iframe and a timestamp of the corresponding iframe.

The method 700 also includes comparing the plurality of iframes of each of the plurality of copies of the video, as shown at block 706. In exemplary embodiments, comparing the plurality of iframes of each of the plurality of copies of the video includes comparing the data records for each of the plurality of iframes. Next, as shown at block 708, the method 700 includes identifying, based on the comparison, one or more common portions of each of the plurality of copies of the video. The one or more common portions are portions of the videos that are present in each of the plurality of copies of the video. Next, as shown at block 710, the method 700 includes identifying, based on the comparison, one or more advertisement in the video. In one embodiment, the advertisements in the video are identified as the portions of the video that are not common to all of the plurality of videos. In exemplary embodiments, identifying one or more advertisement in the video includes providing a start time and end time of the uncommon portions the video. In some embodiments, a video player can be configured to automatically skip or remove the advertisements during playback of the video. The ability to skip the advertisements can be based on permissions granted by the content owner of the video.

In exemplary embodiments, image recognition and object detection algorithms are applied to the iframes in a video. Based on this information, a signature of each iframe is created and stored in a data record. In exemplary embodiments, the comparison of the multiple copies of the video is configured to start at an end of the video and work towards the beginning of the video and to compare the signatures of the iframes as they are encountered. Once a set of iframes that do not match are encountered, the portion of the video with the non-matching iframe signature is marked as a different portion, i.e., an advertisement. In exemplary embodiments, the comparison is performed from back-to-front because, usually in the case of online video clips, advertisements usually are more commonly located at the beginning, not at the end, of a video.

In exemplary embodiments, a plurality of the stored signatures from iframes of a video can be combined to form a signature for the online video. The signatures for the video can then be used by an owner of the video to detect when the video is copied or used in an unauthorized manner. For example, one or more signatures for a video can be created, e.g., a signature can be created using all of the iframes from fixed portions of a video, such as every three or five minutes of the video. The signatures can be compared with the signatures of other videos online to detect unauthorized copying or modification of the video.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method of identifying advertisements in a video comprising:
    obtaining a plurality of copies of the video;
    processing each of the plurality of copies of the video, wherein the processing identifies a plurality of iframes in each of the plurality of copies of the video;
    comparing the plurality of iframes of each of the plurality of copies of the video;
    identifying, based on the comparison, one or more common portions of each of the plurality of copies of the video;
    identifying, based on the comparison, one or more advertisement in the video; and
    creating a data record for each of the plurality of iframes, wherein the data record includes an identification of one or more objects depicted in a corresponding iframe and a timestamp of the corresponding iframe.

2. The computer-implemented method of claim 1, wherein the comparison of the iframes of each of the plurality of copies of the video starts at an end of the plurality of copies of the video and progresses towards a beginning.

3. The computer-implemented method of claim 1, wherein at least two or more of the plurality of copies of the video are obtained using different user accounts.

4. The computer-implemented method of claim 3, wherein each user account includes a user browsing history and web browser cache.

5. The computer-implemented method of claim 1, wherein at least two or more of the plurality of copies of the video are obtained using different source addresses.

6. The computer-implemented method of claim 1, wherein obtaining the plurality of copies of the video includes obtaining at least ten copies of the video.

7. The computer-implemented method of claim 1, wherein comparing the plurality of iframes of each of the plurality of copies of the video includes comparing the data records for each of the plurality of iframes.

8. The computer-implemented method of claim 1, wherein identifying the one or more advertisement in the video includes providing a start time and end time of the uncommon portions the video.

9. A system comprising:
    a processor;
    a memory communicatively coupled to the processor, the memory having stored therein instructions that when executed cause the processor to:
        obtain a plurality of copies of a video;
        process each of the plurality of copies of the video, wherein the processing identifies a plurality of iframes in each of the plurality of copies of the video;
        compare the plurality of iframes of each of the plurality of copies of the video;
        identify, based on the comparison, one or more common portions of each of the plurality of copies of the video;
        identify, based on the comparison, one or more advertisement in the video; and
        create a data record for each of the plurality of iframes, wherein the data record includes an identification of one or more objects depicted in a corresponding iframe and a timestamp of the corresponding iframe.

10. The system of claim 9, wherein the comparison of the iframes of each of the plurality of copies of the video starts at an end of the plurality of copies of the video and progresses towards a beginning.

11. The system of claim 9, wherein at least two or more of the plurality of copies of the video are obtained using different user accounts.

12. The system of claim 11, wherein each user account includes a user browsing history and web browser cache.

13. The system of claim 9, wherein at least two or more of the plurality of copies of the video are obtained using different source addresses.

14. The system of claim 9, wherein obtaining the plurality of copies of the video includes obtaining at least ten copies of the video.

15. The system of claim 9, wherein comparing the plurality of iframes of each of the plurality of copies of the video includes comparing the data records for each of the plurality of iframes.

16. A computer program product for identifying advertisements in a video, the computer program product comprising a computer readable storage medium having program instructions embodied therewith, the program instructions executable by a processor to cause the processor to:

obtain a plurality of copies of a video;

process each of the plurality of copies of the video, wherein the processing identifies a plurality of iframes in each of the plurality of copies of the video;

compare the plurality of iframes of each of the plurality of copies of the video;

identify, based on the comparison, one or more common portions of each of the plurality of copies of the video;

identify, based on the comparison, one or more advertisement in the video; and create a data record for each of the plurality of iframes, wherein the data record includes an identification of one or more objects depicted in a corresponding iframe and a timestamp of the corresponding iframe.

17. The computer program product of claim 16, wherein the comparison of the iframes of each of the plurality of copies of the video starts at an end of the plurality of copies of the video and progresses towards a beginning.

18. The computer program product of claim 16, wherein at least two or more of the plurality of copies of the video are obtained using different user accounts.

* * * * *